M. SKLOVSKY & G. W. MIXTER.
CONVEYER.
APPLICATION FILED DEC. 1, 1906.

1,090,948.

Patented Mar. 24, 1914.

M. SKLOVSKY & G. W. MIXTER.
CONVEYER.
APPLICATION FILED DEC. 1, 1906.

1,090,948.

Patented Mar. 24, 1914.
5 SHEETS—SHEET 4.

Witnesses
Stuart Hilder.
N. Curtis Lammond.

Inventors
Mark Sklovsky and
George W. Mixter
By H. H. Bliss
Attorney

M. SKLOVSKY & G. W. MIXTER.
CONVEYER.
APPLICATION FILED DEC. 1, 1906.

1,090,948.

Patented Mar. 24, 1914.
5 SHEETS—SHEET 5.

UNITED STATES PATENT OFFICE.

MAX SKLOVSKY AND GEORGE W. MIXTER, OF MOLINE, ILLINOIS, ASSIGNORS TO DEERE & COMPANY, OF MOLINE, ILLINOIS, A CORPORATION OF ILLINOIS.

CONVEYER.

1,090,948.  Specification of Letters Patent.  Patented Mar. 24, 1914.

Application filed December 1, 1906. Serial No. 345,963.

*To all whom it may concern:*

Be it known that we, MAX SKLOVSKY and GEORGE W. MIXTER, citizens of the United States, residing at Moline, in the county of Rock Island and State of Illinois, have invented certain new and useful Improvements in Conveyers, of which the following is a specification, reference being had therein to the accompanying drawing.

This invention relates to conveyers which are adapted to carry articles from one level to another and which consists essentially of a track on which the articles move and an endless chain or other similar flexible element mounted to move adjacent the track and having arms or projections which extend across the track. The articles moving along the track are engaged directly or indirectly by the arms of the chain, which is preferably caused to move at a constant speed, so that articles which are being lowered from one elevation to another are retarded by the chain, while if the articles are being lifted from one elevation to another the chain serves as a positive propelling device.

Where the slope of the track varies and at any part is not sufficient to insure that gravity shall overcome the friction of the articles or of their carriers moving down the track, the chain arms serve as pushers to positively propel the articles along such part or parts of the track.

Our invention has to do especially with conveyers of the overhead type and in some of its aspects is restricted to this character of conveyer though some of its features, as will be apparent, are more broadly applicable.

In the detailed description which follows we shall refer to the conveyer as acting by gravity to lower articles from one elevation to another, and in the accompanying drawings we show as a practical embodiment of the invention a conveyer of helical form adapted to lower articles through a vertical shaft.

In the accompanying drawings, Fig. 3 is a plan view of the foot drive; Fig. 16 is a view partly in section and partly in elevation illustrating a different form of the invention; and Figs. 17 and 18 are cross-sectional views illustrating other forms.

In the accompanying drawings, A represents a vertical shaft or well which may be located between the walls B, B' through one or both of which are formed openings C leading to the various floors of the building, these being represented by D', D², D³, D⁴. Within the well A is mounted the conveyer, which is of helical arrangement, this construction being adopted for convenience.

2 represents a track, slide or way along which move the articles being conveyed, or their carriers. We prefer that this track or slide should be in the form of a slotted trough or tube (see Figs. 9, 10 and 11) suitably supported and arranged to receive and have run therein small trolleys 3, from which depend hooks or hangers 4, adapted to extend through the slot 5 in the way or track, and by which the material or articles to be conveyed are suspended. The parts of the trough or tube at the sides of the slot form rails upon which the trolley wheels travel. This form of way and traveling support or carrier for the articles being transported, we are aware, are old, and no claim is made to them broadly considered, and other forms of tracks or slide ways may be employed instead, such as will be hereinafter described. The track or way 2 is supported by suitable brackets, or by bars or beams 6, so disposed, and of such number, as to give the desired rigid support to the track. The track is preferably helically arranged, in order that it may be placed within a comparatively small compass and that its inclination be not too great, for, it will be understood, the trolleys and the articles carried thereby are adapted, in the form of conveyer illustrated and now being described, to travel down the way or track by gravity. Branch tracks 7 lead into the main track 2 at various points, as for instance, one for each floor of the apartment or from each opening C into the shaft. Other branch tracks 8 may be arranged to lead off from the main way or track into the apartments. By this arrangement we are enabled to run material on to the main track from any of several different points arranged at different levels, and also to receive or deliver material from the conveyer at any of several different points, accordingly as the branches are located.

In order to control the movements of the trolleys or other carriers that may pass along the track or way, we provide it with switching devices arranged at the meeting points of the main and branch tracks. 9 indicates a movable section of the track pivotally connected as at 10 with a stationary portion thereof near one of its ends, its free end being adapted to register with either the main track 2 or the branch 7, accordingly as the section is moved. To the end of the switch section 9 we prefer to secure a relatively broad overhanging piece 11 that is adapted to bear upon the contiguous ends of the track sections 2 and 7 and operate to prevent the stationary and the movable sections from getting out of proper vertical adjustment relative to each other.

Figures 4, 5:
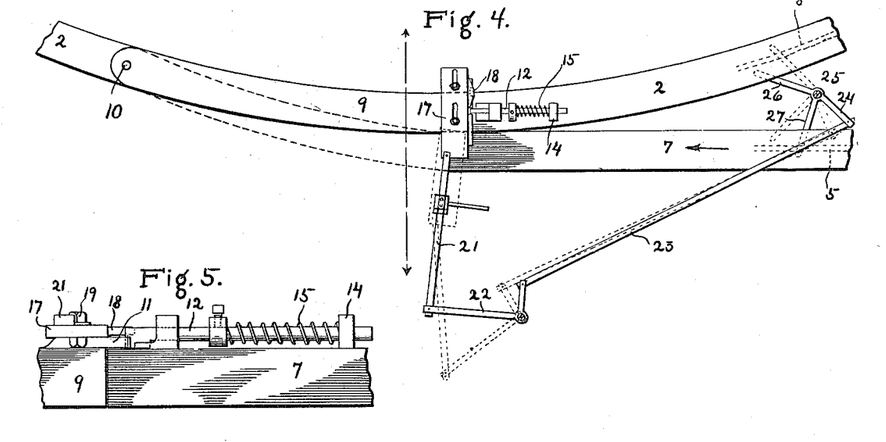
Fig. 4 is a plan view of the track switching arrangement at each branch.
Fig. 5 is a side view of the switch and safety lock therefor.
Figures 6, 9, 15:
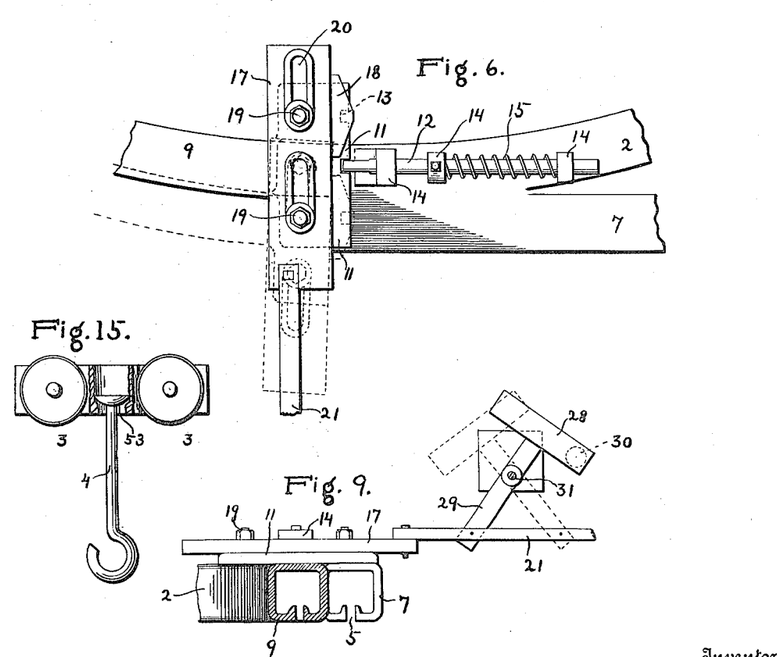
Fig. 6 is a top plan view of the parts shown in Fig. 5.
Fig. 9 is a view partly in section and partly in elevation showing an arrangement for insuring a complete throw or movement of the switch.
Fig. 15 is a detail view of one of the trolleys or carriers used therein.
Figure 7:
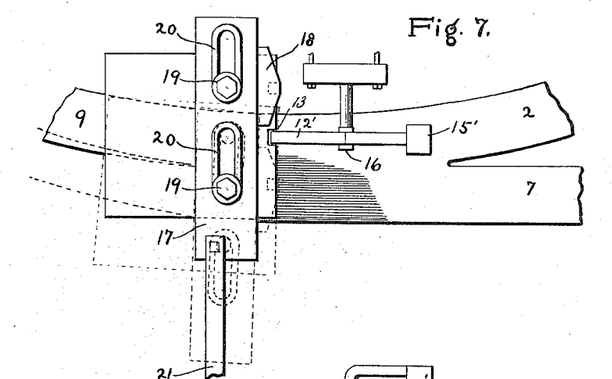
Fig. 7 is a top plan view of another form of switch-lock.
Figure 8:
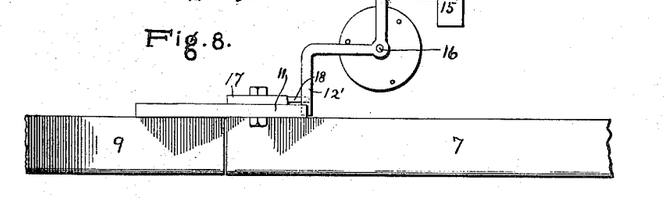
Fig. 8 is a side view of the parts shown in Fig. 7.

In order to hold the free end of the adjustable section 9 in proper horizontal position to accurately register with one or the other of the stationary track sections, we employ a lock, which is preferably in the form of a bolt 12 arranged to engage with notches 13 formed in the edge of the overhang 11. The bolt may be arranged to move rectilineally as indicated in Figs. 4, 5 and 6, where it is represented as being mounted in bearings 14 and actuated by a spring 15. As an alternative or equivalent arrangement the lock or trigger may be arranged to vibrate and be operated by a weight, as represented in Figs. 7 and 8, where it is designated by 12', and is in the form of an angular lever pivoted at 16 and held in locking position by a weight 15'.

17 is a sliding plate carrying a double-faced cam 18 arranged to move the trigger or lock and release the movable switch section. This plate preferably rests upon the overhanging piece 11 to which it is secured by the headed bolts or screws 19, the stems of which pass through slots 20 formed in the plate. A shifting bar 21 is connected with the plate 17 and is the medium through which the latter is operated. In Fig. 4 the parts of the switch are represented as being in position to have the movable switch member register with the main track 2, where it is locked. If now it be desired to shift the switch to cause it to register with the branch track section 7, as when an article approaches along the branch 7, in the direction of the arrow, the plate 17, through the operating bar 21, is shifted into the position indicated by the dotted lines. The first result is to slide the bar or plate 17 relative to the switch member without imparting any movement to the latter, this being permitted by reason of the slots 20, formed in the plate 17. As these movements are taking place the cam 18 comes into engagement with the bolt or lock 12 and forces it back, so freeing the switch section 9. A further movement of the bar or plate 17 causes its motion to be imparted to the switch section 9 and carries the cam 18 beyond the lock or trigger 12. The movements of the parts will be continued until they reach the positions indicated by the dotted lines, when the switch section will register with the branch track, and where it will be locked by the bolt 12.

The switch can be shifted by hand, but we prefer that it should be controlled by the movements of the trolleys or articles that may pass along the track, and we have devised a mechanism for securing this result.

22 is a bell crank lever, to one arm of which is connected the shifting bar 21; and 23 is a link connecting the other arm of such lever with the arm 24 of a three-arm lever 25 mounted between the main track section 2 and a branch 7. The arm 26 of the lever 25 is arranged to extend into the path of the trolleys or other objects that pass along the main track 2, while another arm, 27, is arranged to be moved into the path of the trolleys or objects that may pass along the branch 7. The angular relations of these arms to each other is such that one or the other is always in the path of the trolleys passing along one of the ways 2 or 7, but both arms never stand at the same time in the paths of the trolleys.

When the arm 26 is lying across the opening 5 of the track 2, and hence in the path of a trolley or other object that may be passing along such track or way, the switch 9 is set for the branch track, and unless the switch be thrown the trolley would run off the track at the switch opening; but the arm 26, extending as it does across the path of the trolley, is moved by the passage of the latter and the switch is thrown and caused to register with the main track section before the trolley and its load reaches such section. On the other hand, when the switch is set for the main track, the arm 27 lies across the branch 7, and if a load be sent along such branch toward the main line its passage along the track 7 causes the switch to be set in line therewith. These movements of the switch are best illustrated in Fig. 4.

In order to insure against the switch section coming to rest at an intermediate position where its free end does not register perfectly with either of the stationary track sections, it is sometimes desirable to provide means for completing the throw of the switch after such movement has been started by the action of a passing trolley or load upon one of the arms of the lever 25. An arrangement for securing this result is represented in Fig. 9, where 28 indicates a box mounted at the upper end of a lever or swinging bar 29, the lower or free end of which enters a slot formed in the shifting bar 21. Within the box is a freely movable weight preferably in the form of a ball 30. The box 22 is elongated so that the ball may move from one side of the fulcrum 31 of the lever 29 to the other accordingly as the box is inclined. The shifting of the switch-throwing mechanism by the passage of a trolley or load will be sufficient to move the lever 29 sufficiently to incline the box in a direction opposite to that which it occupied before the shifting operation began, and as soon as this change of inclination takes place, the weight will roll down to the opposite end of the box and operate to assist in the further movement of the parts, insuring a complete throw of the switch.

The parts which have thus far been described constitute a complete gravity conveying apparatus and if the inclination of the way be not too great it is entirely practicable to use it with no other parts than those which have been described. But when the conveyer is erected in a structure of ordinary proportions, it is impracticable to give to the track that gentle inclination which is necessary to prevent dangerously rapid movements of the trolleys as they descend from one part of the structure to a lower level. We have therefore combined with the gravity-conveying mechanism thus far described a retarding mechanism. Broadly stated this consists of an endless chain of similar device, a guide therefor arranged parallel with and in close proximity with the track conveyer, means for regulating the speed at which the chain may travel, and means carried by the chain and extending into the path of the trolleys or loads carried on the track for arresting the free movements of such moving objects.

Referring to the drawings, 32 indicates an endless chain. It is preferably a sprocket chain and may be in many of its details of any usual or preferred construction. It passes around an upper or head sprocket wheel 33 and a lower or foot sprocket wheel 34. One run (the up run) of the chain preferably extends in a straight line between these sprocket wheels and is at the axis of the helix formed by the main track of the conveyer. The chain passes from the upper or head sprocket wheel 33 to a guide wheel 35 mounted upon an axis 36, and from this wheel to a stationary guide 37, that is arranged adjacent to and parellel with the way or track 2, the chain guide and conveyer track being preferably supported from the same beams or supports, although this is not a necessary arrangement. The chain guide 37 terminates at such point along the lower part of the conveyer track as to allow the loads to move off without risk of interference from the chain. At this point a guide wheel 38 is placed in such position relative to the guide 37 and track 2 that the chain will easily travel around the wheel and move away from the track 2, thereby relinquishing control of the load. From the wheel 38 the chain is then led to the sprocket wheel 34, placed in such position that the chain will engage it without binding, and from thence it travels vertically upward in the center of the shaft to the head sprocket wheel 33, which is preferably situated in the same vertical plane as is the sprocket 34 below.

Figures 11, 12:
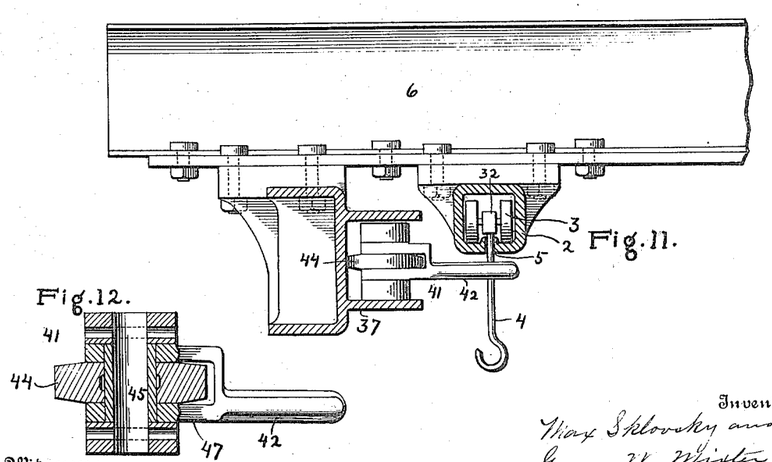
Fig. 11 is a cross-sectional view on the line 11—11 of Fig. 10, showing the chain and one of the trolleys.
Fig. 12 is a cross-sectional view, Fig. 13 a side elevation, and Fig. 14 a top plan view, of the chain employed in our apparatus.
Figure 13:
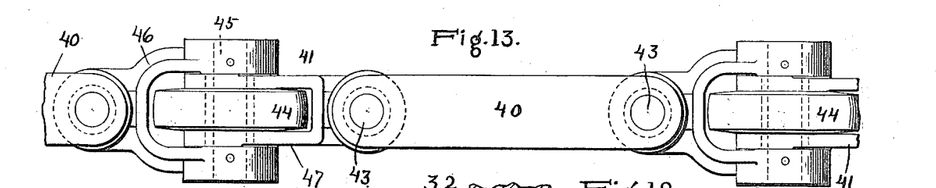
Figures 14, 18:
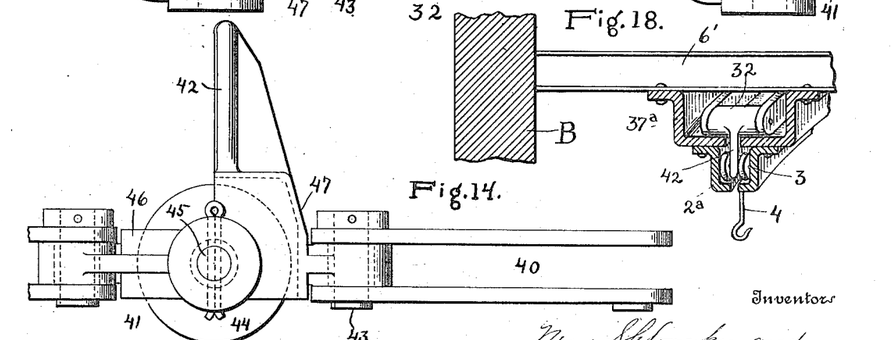

The chain is formed of a series of articulated links certain of which are adapted to engage with the teeth of the sprocket wheels 33 and 34. The details of construction of this chain are illustrated in Figs. 12, 13 and 14 by reference to which it will be seen that the links 40 thereof are open for engagement with the sprocket teeth, while other links 41 are of peculiar construction, and are provided with laterally extending arms or projections 42 adapted to extend outward into the path of the trolleys or articles which may be passing along the track of the conveyer. The links 41, which are intermediate the links 40, and are connected thereto by the pins or pintles 43, are each formed of two parts 46, 47. The part 46 is pivotally connected with the link 40 in advance of it and is substantially U-shaped as indicated in Fig. 13, its two arms lying one above the other and having between them the arms or central portion of the part 47 of the link. These two parts, 46, 47, are pivotally united by a pin or pintle 45, the axis of which is at a right angle to the axes of the pintles 43, uniting the link 41 with the adjacent links 40. The laterally extending arm 42 is preferably carried by the part 47 of the link. 44 is an anti-friction roller mounted upon the pintle 45, preferably at the center thereof, and between the two arms of the part 47 of the link. This roller is arranged to run in engagement with the back wall of the stationary chain guide 37.

It will be observed that the two parts of the link 41 are united to each other by a coupling the axis of which is at right angles to the axes of the couplings that unite such link with the other parts of the chain; thus forming a link that constitutes a sort of universal joint in the chain.

Figure 1:
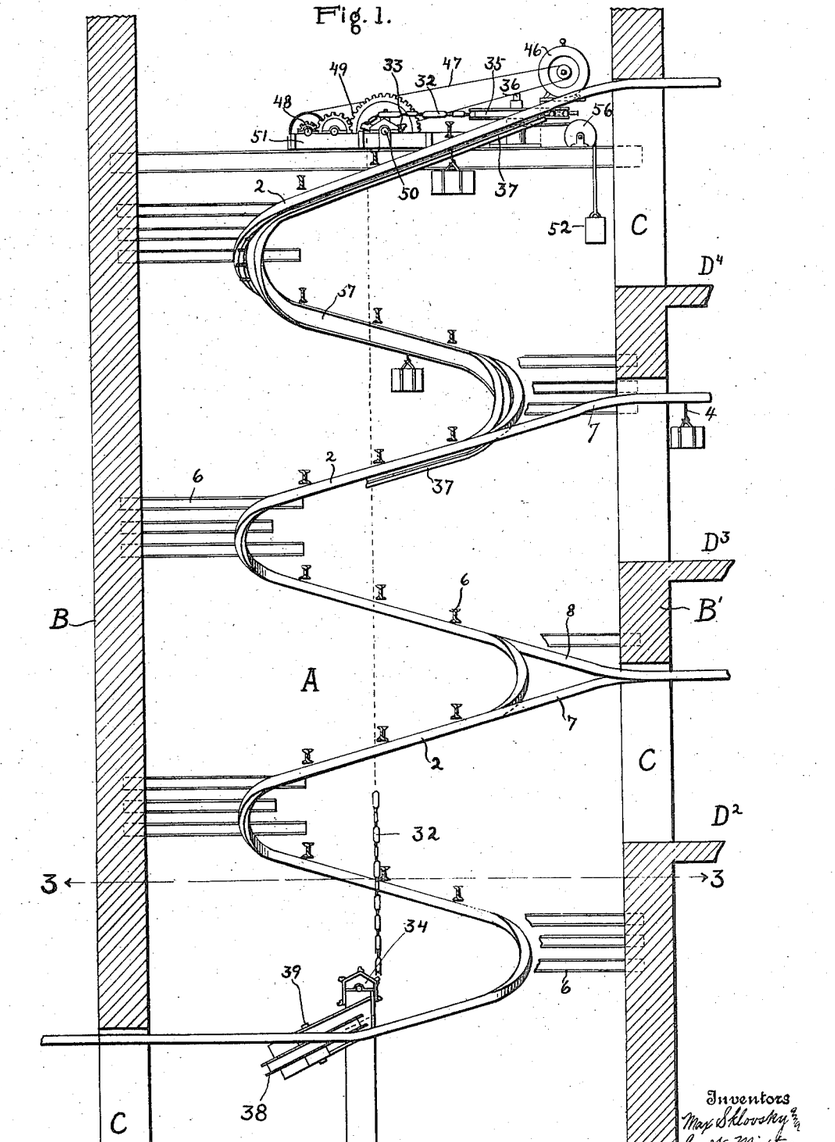
—Figure 1 is a view showing in elevation one form of conveyer embodying our invention, the drawing being somewhat diagrammatic in character and illustrating the invention applied to a structure four stories in height.
Figure 2:
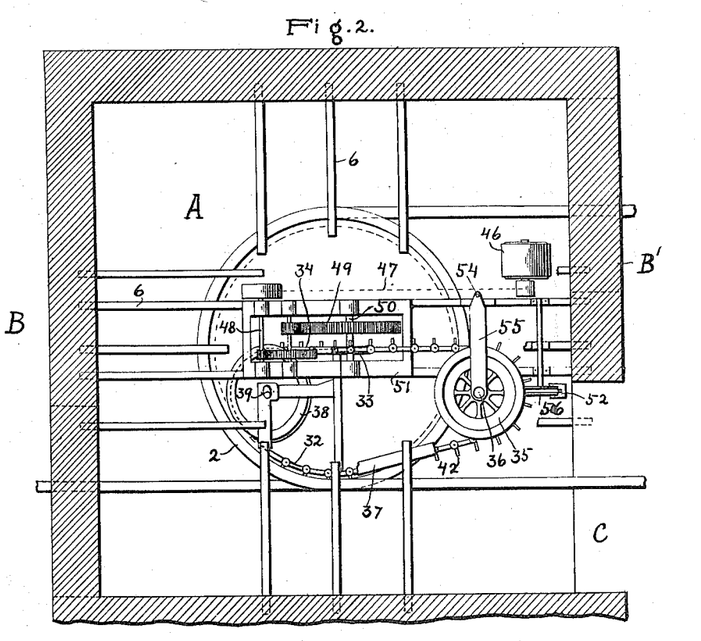
Fig. 2 is a top view of the same apparatus taken above the head drive.
Figure 10:
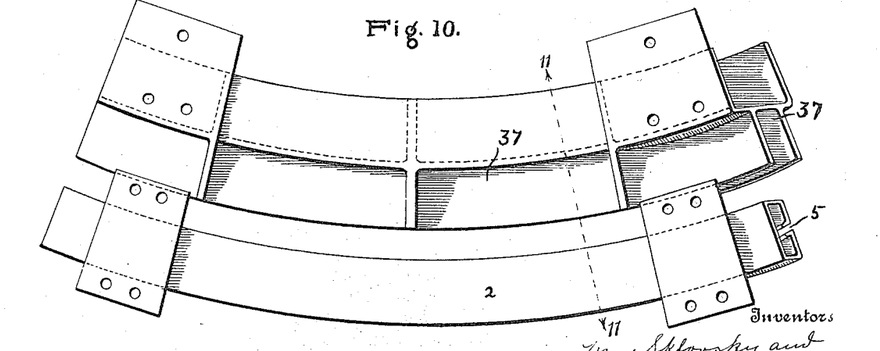
Fig. 10 is a detail view, enlarged, of a section of the track and chain guide.

It will be seen, particularly by reference to Figs. 1 and 10, that the chain guide follows the course of the conveyer track. Where the latter is a helix the chain guide is a helix of the same pitch as, but of smaller radius than, the track. Thus the chain in following the guide 37 and in passing over the guide and sprocket wheels must be flexed in various directions, and the link construction thereof which we have described and illustrated permits this without the binding of any of the joints or necessitating undue looseness of parts. The guide gives to the chain a rigid support, at the same time effectively constrains and directs its motions, so that it follows the conveyer track or is diverted therefrom as circumstances may require.

When the track and the chain guide form a straight incline, i. e., one having no deflection to right or left from a straight course, it is clear that the chain need not be provided with joints at right angles to each other.

While we have described the chain as being a retarding device, it is evident that it could be used as a propelling means, or both as a propelling and retarding means, as would be the case should the track of the conveyer for a portion of its course lie in a horizontal plane or even be upwardly inclined.

The chain, when used entirely as a retarding device, might be free to be moved by the loads passing along the conveyer track and the speed be controlled by suitable retarding or braking mechanisms. We prefer, however, that the chain should be positively driven by some motor, such motor operating to regulate the speed of the chain and hence of the conveyer, and incidentally as a braking device to check the speed of the conveyer if it should become overloaded and tend to run too rapidly.

46 is a motor, an electric motor being represented, connected by a belt 47, a shaft 48 and a train of speed-reducing gearing 49, with the shaft 50 of the head sprocket wheel 33, the motor and gearing being mounted in a suitable framework 51.

The upper guide wheel 35 is preferably adjustably supported, being mounted in a bracket or arm 55, pivoted at 54, and has connected therewith a weight 52, the suspending cable of which passes over a guide wheel 56. This arrangement permits the wheel 35 to move toward and from the sprocket wheel 33 and the upper end of the chain guide 37, and constitutes a compensating means for taking care of the slack that may be in the chain, and to give to the latter a uniform tension.

As the inclination of the track changes,—as for instance the inclination of the main portion 2 is greater than that of the branches 7 and 8,—we make provision for maintaining the hangers 4, from which the loads are suspended, in substantially vertical positions whatever the inclination of the track or way. This may be accomplished by interposing a ball and socket or other flexible connection 53 between the upper end of the hanger and the trolley which carries it.

We have thus far described but one, and that in some respects the preferred, form or embodiment of our invention, but we do not wish to be limited thereto, as many of the parts may be modified in construction and relation to other parts, and we will now describe several embodiments differing in details of construction from that which has been described.

Figures 3, 16, 17:
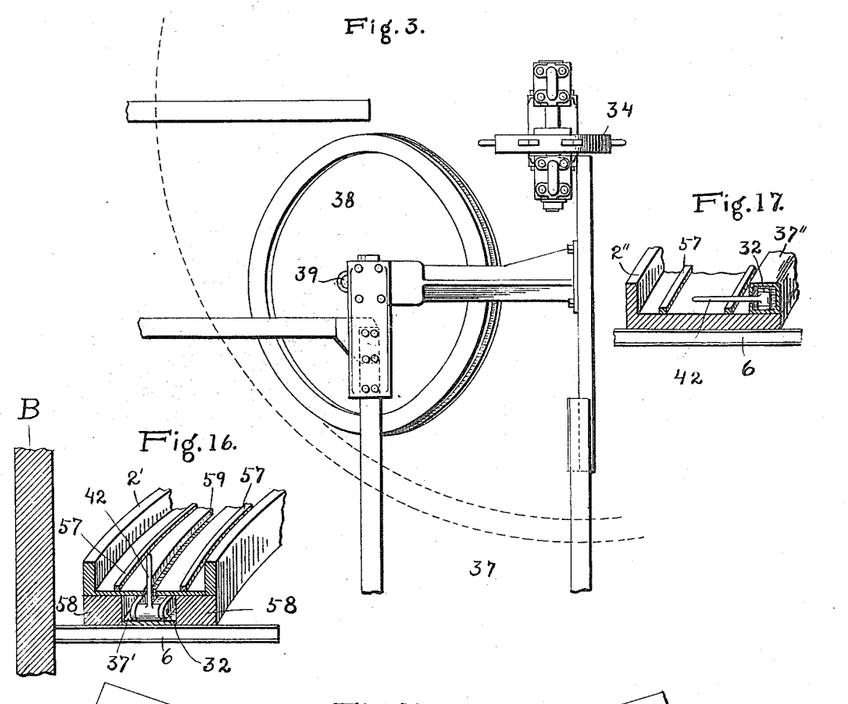

Referring to Fig. 16, 2' represents a track along which the articles to be conveyed are adapted to move, it thus being a construction in which a trolley, like that at 3 in the construction already described, is unnecessary. The track is of open channel construction and is provided with slide rails 57 where such are desirable. The chain guide 37' is arranged directly below the track 2'. It is formed by a channel in a bar, rail or frame construction 58 upon which preferably the track 2' rests, and to which it is directly secured. The arms 42 of the chain, which serve as the retarders for the articles passing along the track, or as pushers therefor should the inclination of the track be such that the articles will not move forward by gravity, extend upward through a slot 59 formed in the bottom of the track 2.

In Fig. 17 there is illustrated a form of track quite similar to that shown in Fig. 16 but differing in this that the chain guide constitutes the side wall or flange of the track 2''.

In Fig. 18 still another arrangement of the track and chain guide is represented. Here the chain guide 37$^a$ is represented as being secured to the underside of a bracket 6', while the track 2$^a$ is secured to the underside of the chain guide. The track is adapted to receive the trolleys 3 from which the packages or loads being conveyed are suspended, and the arms 42 of the chain pass downward through a slot in the chain guide 37$^a$ into the path of the trolleys 3.

These various illustrations of different embodiments of our invention serve to illustrate how widely the several parts may be varied in construction and arrangement without departing from the principle of the invention.

The operation of the apparatus may be easily understood from the foregoing description and an examination of the accompanying drawings. The trolleys or carriers 3 are loaded at one or another floor and are sent along the branches 7 to the main track, where they descend by gravity, the speed of their movement being regulated by the retarding mechanism described. Where constructions such as are represented in Figs. 16 and 17 are employed the trolleys, of course, are dispensed with and the articles themselves move along the tracks. The load or loads pass out at the lower end of the track where they are removed, but they may be caused to pass to any floor to which a branch 8 may lead, as may be desired, for it will be understood that a proper switch is interposed at the junction of each branch 8 with the main line. Thus by means of the apparatus described it is possible to load at any floor and to deliver at any lower floor, as may be desired.

As has been stated, in case any part of the track takes a horizontal course or an upward course, or, indeed, any course such that gravity will not act to advance the carriers, the chain serves to positively advance the carriers on this part of the track. Also the conveyer can be adapted to elevate goods from one level to another by reversing the direction of travel of the chain.

What we claim is:—

1. In a conveyer, the combination of an inclined main slide or track along which articles being moved travel, means for suspending such articles under the track, branch tracks connecting therewith at various levels, a guide arranged adjacent and substantially parallel to said track, and a controlling device supported in said guide arranged to govern the movements of the articles when traveling along the slide or track, substantially as set forth.

2. In a conveyer, the combination of the helically arranged track 2 for supporting and guiding the objects to be moved, a guide 37 arranged to one side of the track, substantially parallel therewith and adjacent thereto and open on the side toward the track, an endless chain arranged to run in the said guide, a series of projections 42 carried by the chain and extending outward toward the track, the sprocket wheels 33 and 34 with which the chain engages, and the guide wheels 35 and 38 interposed between the sprocket wheels and the ends of the guides 37, substantially as set forth.

3. In a conveyer, the combination of a series of carriers, each having a vertically extending hook and oppositely disposed wheels connected with the hook near the upper end thereof, a track for the wheels having two parallel rails arranged oppositely and having rail supports above the rails and symmetrically disposed with respect to the center lines of the carriers, a guide parallel to the said track, and an endless controlling device mounted to run in the said guide and having projections extending laterally into the path of the hooks of the carriers, the construction being such that the space beneath the track is unobstructed and free for the movement of bodies suspended from the carriers, substantially as set forth.

4. In a conveyer, the combination of a track consisting of a tube closed at its upper side and centrally slotted at its lower side, means above the tube for supporting it, carriers having wheels arranged to travel on the lower inner surface of the tube at opposite sides of the slot and having hooks arranged to extend through the slot, a guide parallel to the said tube, an endless controlling device mounted to run in the said guide and having projections extending laterally into the path of the hooks of the carriers, the construction being such that the space beneath the track is unobstructed and free for the movement of bodies suspended from the carriers, substantially as set forth.

5. In an overhead conveyer, the combination of a helically arranged track, carriers mounted thereon, a channel-like guide extending substantially parallel to and on the inner side of the track the guide being entirely open at its inner side, an endless controlling means mounted in said guide and having projections extending into the path of the carriers on the track, and means engaging the said controlling means near the ends of the guide for tensioning it and thus causing it to be held in place in the guide by its own tension, substantially as set forth.

6. In a transporting or conveying system, a series of substantially horizontally arranged guideways at different levels, a connecting guideway descending from the top guideway to the lower one, means for connecting at will the horizontal guideways at any of the levels with the connecting guideway, whereby moving carriers adapted to fit any of said guideways may be guided from the horizontal way to the descending way or vice versa, a power-controlled endless checking or retarding mechanism having a series of traveling checks or holders moving parallel with the lines of the descending guideway, and a series of disconnected carriers each adapted to support a load and adapted to be guided at will from any of said horizontal guideways to the descending guideway and to be guided therefrom to a horizontal guideway, substantially as set forth.

7. In an overhead transporting or conveying system, a series of substantially horizontal guideways at different levels, a connecting guideway descending from the top guideway to the lower one, means for connecting at will the horizontal guideways at any of the levels with the descending guideway, whereby moving suspended carriers adapted to fit any of the said guideways may be guided from a horizontal way to the descending way or vice versa, a power-controlled endless checking or retarding mechanism having a series of traveling checks or holders moving parallel with the lines of the descending guideway, and a series of disconnected carriers suspended from said guideways each adapted to support a load and to be guided at will from any of said horizontal guideways to the descending guideway and to be guided thereupon to a horizontal guideway, substantially as set forth.

8. In an overhead transporting or conveying system, a series of substantially horizontal article supporting and directing guideways at different levels, a connecting guideway descending from the top guideway to the lower one, means for connecting at will the horizontal guideways at any of the levels with the descending guideway whereby moving articles may be guided from a horizontal way to the descending way or vice versa, and a power-controlled endless checking or retarding mechanism having a series of traveling checks or holders extending across the descending guideway and moving parallel with the lines thereof, substantially as set forth.

9. In an overhead transporting or conveying system, a series of substantially horizontally arranged guideways at different levels, a descending guideway leading down from the top guideway to the lower one, means comprising suitable switches and branches 8 leading off from the descending guideway to the horizontal guideways for connecting at will a horizontal guideway with the descending guideway and branches 7 leading to the descending guideway, whereby moving articles may be guided from the descending way to a horizontal way or vice versa, and a power-controlled endless checking or retarding mechanism having a series of traveling checks or holders moving parallel with the descending way, substantially as set forth.

10. An overhead carrier having in combination a descending guideway, branches 8 descending from the same, branches 7 descending to the same, horizontal guideways connected with said branches, a guide parallel with the descending guideway, an endless controlling device on said guide and having arms extending laterally across the descending guideway, and article-suspending carriers on the descending guideway engageable by the said arms, the said carriers and arms being held from movement laterally away from each other by the said guideway and guide, substantially as set forth.

In testimony whereof we affix our signatures, in presence of two witnesses.

MAX SKLOVSKY.
GEORGE W. MIXTER.

Witnesses:
C. H. POPE,
F. H. DUNN.